US010298873B2

(12) United States Patent
Moon

(10) Patent No.: US 10,298,873 B2
(45) Date of Patent: May 21, 2019

(54) IMAGE DISPLAY APPARATUS AND METHOD OF DISPLAYING IMAGE

(71) Applicant: SAMSUNG ELECTRONICS CO., LTD., Suwon-si (KR)

(72) Inventor: Ji-bum Moon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/340,347

(22) Filed: Nov. 1, 2016

(65) Prior Publication Data

US 2017/0195610 A1  Jul. 6, 2017

(30) Foreign Application Priority Data

Jan. 4, 2016 (KR) .................. 10-2016-0000425

(51) Int. Cl.
| | |
|---|---|
| *H04N 5/445* | (2011.01) |
| *G06F 3/16* | (2006.01) |
| *G10L 15/08* | (2006.01) |
| *H04N 5/44* | (2011.01) |
| *H04N 21/422* | (2011.01) |
| *H04N 21/482* | (2011.01) |
| *G10L 15/00* | (2013.01) |

(52) U.S. Cl.
CPC ......... *H04N 5/44513* (2013.01); *G06F 3/167* (2013.01); *G10L 15/08* (2013.01); *H04N 5/4403* (2013.01); *H04N 21/42222* (2013.01); *H04N 21/4828* (2013.01); *G10L 15/00* (2013.01); *G10L 2015/088* (2013.01); *H04N 2005/443* (2013.01); *H04N 2005/4432* (2013.01); *H04N 2005/44521* (2013.01)

(58) Field of Classification Search
CPC .................................................. H04N 5/44513
USPC ........................................................... 725/37
See application file for complete search history.

(56) References Cited

U.S. PATENT DOCUMENTS

| | | | | |
|---|---|---|---|---|
| 6,065,042 | A  * | 5/2000 | Reimer | G06F 17/30817 |
| | | | | 348/E7.071 |
| 6,658,662 | B1 * | 12/2003 | Nielsen | H04N 7/16 |
| | | | | 348/E7.054 |
| 7,664,678 | B1 * | 2/2010 | Haber | G06F 17/30274 |
| | | | | 705/26.9 |
| 8,079,054 | B1 * | 12/2011 | Dhawan | G06Q 30/00 |
| | | | | 705/14.4 |
| 9,462,340 | B1 * | 10/2016 | Mathurin | H04N 21/234336 |
| 2002/0133562 | A1 * | 9/2002 | Newnam | G06Q 30/02 |
| | | | | 709/216 |
| 2002/0162117 | A1 * | 10/2002 | Pearson | H04N 5/445 |
| | | | | 725/109 |
| 2004/0073493 | A1 * | 4/2004 | Kato | G06Q 30/02 |
| | | | | 705/500 |

(Continued)

FOREIGN PATENT DOCUMENTS

KR    10-1456974 B1    10/2014

*Primary Examiner* — Michael B. Pierorazio
(74) *Attorney, Agent, or Firm* — Sughrue Mion, PLLC

(57) ABSTRACT

Provided are an image display apparatus and an image display method. The image display apparatus includes a display configured to display a use guide comprising help information, and a controller configured to extract a keyword from a sentence spoken by a user, assign the keyword to a help category, and generate the help information based on the help category and the keyword.

15 Claims, 12 Drawing Sheets

(56) References Cited

U.S. PATENT DOCUMENTS

| | | | | |
|---|---|---|---|---|
| 2005/0066352 | A1* | 3/2005 | Herley | H04N 7/16 725/19 |
| 2008/0266449 | A1* | 10/2008 | Rathod | G06F 17/30796 348/468 |
| 2008/0285940 | A1* | 11/2008 | Kulas | G11B 27/3027 386/248 |
| 2009/0094632 | A1* | 4/2009 | Newnam | H04N 7/17318 725/24 |
| 2009/0112592 | A1* | 4/2009 | Candelore | H04N 5/4403 704/246 |
| 2009/0293081 | A1* | 11/2009 | Pirani | H04N 7/17318 725/25 |
| 2009/0299752 | A1* | 12/2009 | Rodriguez | D06F 58/28 704/275 |
| 2011/0283189 | A1* | 11/2011 | McCarty | H04N 5/44543 715/707 |
| 2012/0016678 | A1* | 1/2012 | Gruber | G06F 17/3087 704/275 |
| 2012/0210349 | A1* | 8/2012 | Campana | G06F 3/147 725/32 |
| 2014/0181865 | A1* | 6/2014 | Koganei | H04N 21/42203 725/38 |
| 2014/0278834 | A1* | 9/2014 | Lautz | G06Q 30/0203 705/12 |
| 2014/0350925 | A1* | 11/2014 | Park | G10L 15/22 704/231 |
| 2014/0373082 | A1* | 12/2014 | Miyazaki | G06F 17/30023 725/110 |
| 2015/0082349 | A1* | 3/2015 | Ishtiaq | H04N 21/23418 725/40 |
| 2015/0229975 | A1* | 8/2015 | Shaw | H04N 21/23439 725/10 |

* cited by examiner

IMAGE DISPLAY APPARATUS AND METHOD OF DISPLAYING IMAGE

CROSS-REFERENCE TO RELATED APPLICATION

This application claims the benefit of Korean Patent Application No. 10-2016-0000425, filed on Jan. 4, 2016, in the Korean Intellectual Property Office, the disclosure of which is incorporated herein in its entirety by reference.

BACKGROUND

1. Field

The present disclosure relates to image display apparatuses and methods of displaying an image, and more particularly, to methods of providing a use guide.

2. Description of the Related Art

Image display apparatuses are apparatuses that have functions of displaying an image which may be viewed by users. Users may watch broadcast content via the image display apparatuses. The image display apparatuses display on a screen broadcast content selected by a user from among broadcast signals transmitted from broadcasting stations. A current trend is that analogue broadcasting has been converted into digital broadcasting worldwide.

Digital broadcasting denotes transmitting digital image and sound signals. Compared to analogue broadcasting, digital broadcasting is robust with respect to external noise thus having less data loss, is easy with respect to error correction, has high resolution, and provides vivid screens. Also, unlike the analogue broadcasting, the digital broadcasting provides a bi-directional service.

Recently, smart televisions (TVs) providing various content in addition to digital broadcasting functions have been provided. Smart TVs do not manually operate according to selection of a user, but aim to analyze and provide what the user wants without manipulation by the user.

SUMMARY

Additional aspects will be set forth in part in the description which follows and, in part, will be apparent from the description, or may be learned by practice of the presented exemplary embodiments.

According to an aspect of an exemplary embodiment, an image display apparatus includes a display configured to display a use guide including help information, and a controller configured to extract a keyword from a sentence spoken by a user, assign the keyword to a help category, and generate the help information based on the help category and the keyword.

The help category may be set based on a type of an operation performed in response to the sentence spoken by the user.

The operation may include at least one of searching, executing an application, and changing a channel.

The controller may further be configured to determine a help category corresponding to the sentence spoken by the user by analyzing the sentence and to assign the keyword extracted from the sentence to the determined help category.

The controller may further be configured to determine whether content of the sentence spoken by the user is successfully processed and extract the keyword from the sentence spoken by the user in response to determining that the content of the sentence is successfully processed.

The image display apparatus may further include a storage unit configured to store keywords.

The storage unit may further be configured to store a predetermined number of recently spoken keywords.

The controller may further be configured to generate the help information based on a keyword randomly selected from among the keywords stored in the storage unit.

The controller may further be configured to control the display such that the display displays all of the generated help information, according to a user input.

According to an aspect of an exemplary embodiment, a method of displaying an image includes extracting a keyword from a sentence spoken by a user and assigning the keyword to a help category, generating help information based on the help category and the keyword, and displaying a use guide including the help information.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
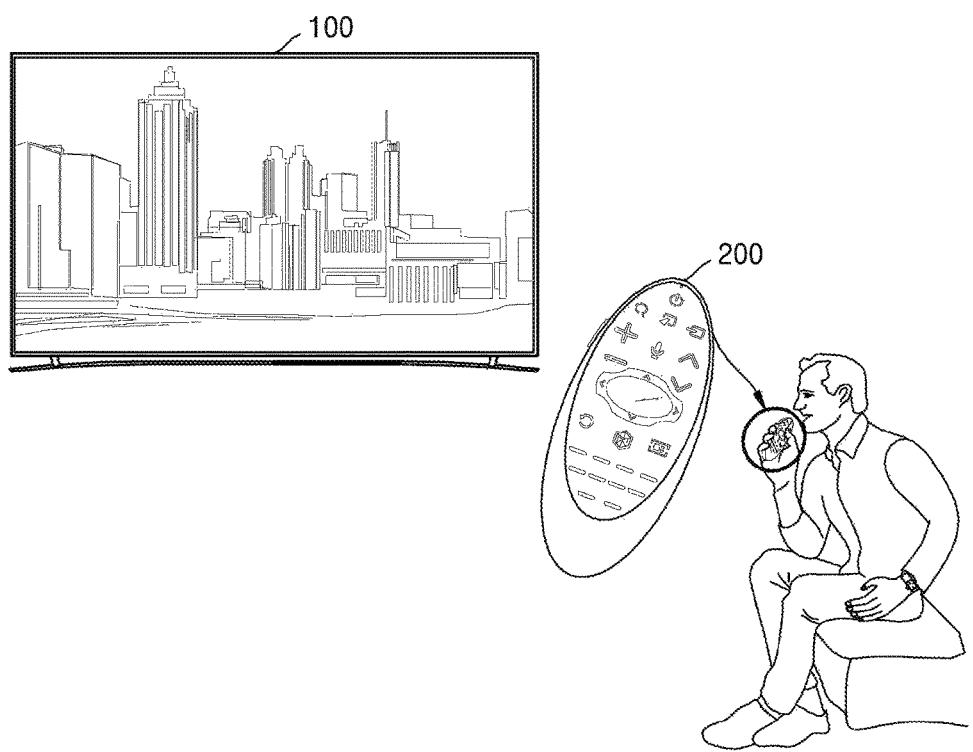
FIG. 1 is a view showing an example of an image display apparatus configured to apply a method of displaying an image, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in the present disclosure are selected from among common terms that are currently widely used in consideration of their function in the present disclosure. However, the terms may be different according to an intention of one of ordinary skill in the art, a precedent, or the advent of new technology. Therefore, the terms used in the present disclosure are not merely designations of the terms, but the terms are defined based on the meaning of the terms and content throughout the present disclosure.

The terminology used herein is for the purpose of describing particular exemplary embodiments only and is not intended to be limiting of exemplary embodiments. As used herein, the singular forms "a," "an" and "the" are intended to include the plural forms as well, unless the context clearly indicates otherwise. Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

Throughout the specification, in particular, in claims, "the" or other similar referring expressions may refer to both a singular form and a plural form. Also, if there is no description explicitly referring to orders of operations included in methods according to the present disclosure, the operations may be performed in an appropriate order. The present disclosure is not limited to the described orders of operations.

Expressions such as "in some embodiments" and "according to an embodiment" described in various parts of this specification do not necessary refer to the same embodiments.

The present disclosure may be described in terms of functional block components and various processing steps. Some or all of such functional blocks may be realized by any number of hardware and/or software components configured to perform the specified functions. For example, the functional blocks of the present disclosure may be realized by one or more microprocessors or by circuit components configured to perform certain functions. Also, the functional blocks of the present disclosure may be realized by various programming or scripting languages. The functional blocks may be implemented in algorithms that execute on one or more processors. Furthermore, the present disclosure could employ any number of conventional techniques for electronics configuration, signal processing and/or control, data processing and the like. The words "mechanism," "element," "device," and "component" are used broadly and are not limited to mechanical or physical embodiments.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Hereinafter, the present disclosure will be described in detail with reference to the accompanying drawings.

FIG. 1 is a view showing an example of an image display apparatus 100 configured to apply a method of displaying an image, according to an exemplary embodiment.

As illustrated in FIG. 1, the image display apparatus 100 may be a television (TV). However, the image display apparatus 100 is not limited thereto. The image display apparatus 100 may be an electronic device including a display. For example, the image display apparatus 100 may include various electronic devices, such as cellular phones, tablet personal computers (PCs), digital cameras, camcorders, laptop computers, desktop computers, electronic book terminals, digital broadcasting terminals, personal digital assistants (PDAs), portable multimedia players (PMPs), navigation devices, MP3 players, wearable devices, etc. In addition, the image display apparatus 100 may be a stationary or mobile device, and may be a digital broadcasting receiver configured to receive digital broadcasting.

The image display apparatus 100 may include not only a flat image display apparatus but also an image display apparatus having a curved screen having a certain curvature, and a flexible image display apparatus, a curvature of which is adjustable. An output resolution of the image display apparatus 100 may include, for example, high definition (HD), full HD, ultra HD, or higher resolution than the ultra HD.

A controller 200 may include various types of devices configured to control the image display apparatus 100, such as a remote controller or a cellular phone.

Also, the controller 200 may control the image display apparatus 100 by using short-range communication, such as infrared communication or Bluetooth communication. The controller 200 may control functions of the image display apparatus 100 by using at least one of a provided key (including a button), a touchpad, a microphone (not shown) configured to receive a user's voice, and a sensor (not shown) configured to recognize motion of the controller 200.

The controller 200 may include a power on/off button for turning on/off the image display apparatus 100. Also, based on a user input, the controller 200 may shift a channel, adjust a volume of sound, select ground wave/cable/satellite broadcasting, and set an environment, with respect to the image display apparatus 100.

Also, the controller 200 may include a pointing apparatus. For example, the controller 200 may operate as the pointing apparatus, when receiving a certain key input.

The image display apparatus 100 may provide a voice recognition function. For example, a user may speak a certain sentence for the image display apparatus 100 to perform a certain operation. For example, in order to search for A, the user may speak one of "search for A," "find A," "A," and "search the web for A." However, it is not limited thereto. Then, the image display apparatus 100 may recognize and process words spoken by the user and perform an operation corresponding to the spoken words.

However, the voice recognition function provided by the image display apparatus 100 may not be familiar to the user. Thus, the image display apparatus 100 may provide a use guide so that the user may easily understand a method of using the voice recognition function. For example, the image display apparatus 100 may provide sentences such as "tune to channel 10," and "change the channel to channel 10," as help information. Here, the help information may refer to sentences that may be spoken by the user for the image display apparatus 100 to perform a certain operation. For example, "tune to channel 10," or "change the channel to channel 10" may be an example sentence that has to be spoken by the user to change the channel.

Also, the image display apparatus 100 may effectively provide the use guide to the user by generating the help information by using a keyword familiar to the user and displaying the generated help information. For example, the image display apparatus 100 may generate the help information by using a channel number of a channel that the user frequently watches, and display the generated help information.

Figure 2:
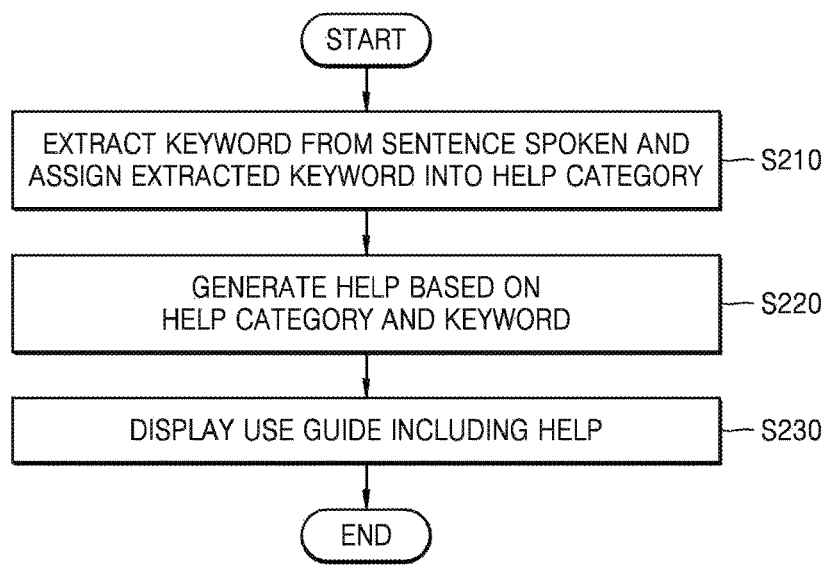
FIG. 2 is a flowchart of a method of displaying an image, according to an exemplary embodiment.

FIG. 2 is a flowchart of a method of displaying an image, according to an exemplary embodiment.

In operation S210, the image display apparatus 100 may extract a keyword from a sentence spoken by a user and assign the extracted keyword to a help category. Here, the image display apparatus 100 may extract the keyword from the sentence spoken by the user, spoken content of which is successfully processed.

Thus, if the sentence spoken by the user is not recognized well by the image display apparatus 100, the image display apparatus 100 may not extract a keyword from the sentence spoken by the user.

Also, the image display apparatus 100 may set the help category based on a type of operation, which is performed by the image display apparatus 100 in response to the sentence spoken by the user. For example, the operation performed by the image display apparatus 100 in response to the sentence spoken by the user may include at least one of searching, executing an application, and changing a channel. Accordingly, the image display apparatus 100 may set at least one of search, application launch, and channel tune as the help category. However, operations performed by the image display apparatus 100 and help categories are not limited thereto.

Also, the image display apparatus 100 may assign the extracted keyword to the set help category and store the keyword. For example, the keyword "Olympic games" extracted from "search for Olympic games" spoken by the user may be assigned and stored to a "search" category. Detailed aspects with respect to the process of storing keywords according to the help category will be described later with reference to FIGS. 3A through 3C.

Also, according to exemplary embodiments, the image display apparatus 100 may be configured to store only a predetermined number of recently spoken keywords.

For example, the image display apparatus 100 may store only ten recently spoken keywords for each help category. Also, when the ten keywords are already currently stored in the "search" category, the image display apparatus 100 may delete the keyword that has been stored for the longest period of time and store a new keyword. Here, the number of stored keywords may vary according to exemplary embodiments, and is not limited to the example described above.

Thus, the image display apparatus 100 may store words that a user recently searched for, numbers of channels that the user has recently watched, and applications that have been recently executed, as the keywords. Also, the image display apparatus 100 may store the keywords by taking into account recent interests of the user.

In operation S220, the image display apparatus 100 may generate help information based on the help category and the extracted keyword.

The image display apparatus 100 may generate the help information based on a keyword randomly selected from among a plurality of stored keywords and the help category. For example, when "Olympic games" and "Seoul" are stored as keywords in the "search" category, the image display apparatus 100 may randomly select either the keyword "Olympic games" or "Seoul" and generate the help information. Here, when "Seoul" is selected, the image display apparatus 100 may generate the help information corresponding to the "search" category, such as "find Seoul," "search for Seoul," "search the web for Seoul," etc. However, the generated help information is not limited to the examples described above.

In operation S230, the image display apparatus 100 may display a use guide including the help.

The image display apparatus 100 may provide to the user the use guide related to the method of using a voice recognition function. For example, in response to a user input selecting a predetermined button of the controller 200, the image display apparatus 100 may display the use guide on a screen. Here, the image display apparatus 100 may display the help information generated based on the stored keyword and the help category. The help information is generated based on the keyword that was actually spoken by the user, and thus, the image display apparatus 100 may provide the help information which would be more familiar to the user.

In addition, the image display apparatus 100 may provide various types of use guide. For example, the image display apparatus 100 may provide an animation type use guide, or provide the use guide by displaying a list of a plurality of help messages generated for each help category. However, it is not limited thereto.

Also, the image display apparatus 100 may display all of the generated help information, according to a user input.

FIGS. 3A through 3D are views for describing the process of storing keywords by the image display apparatus 100, according to an exemplary embodiment.

Figure 3A:
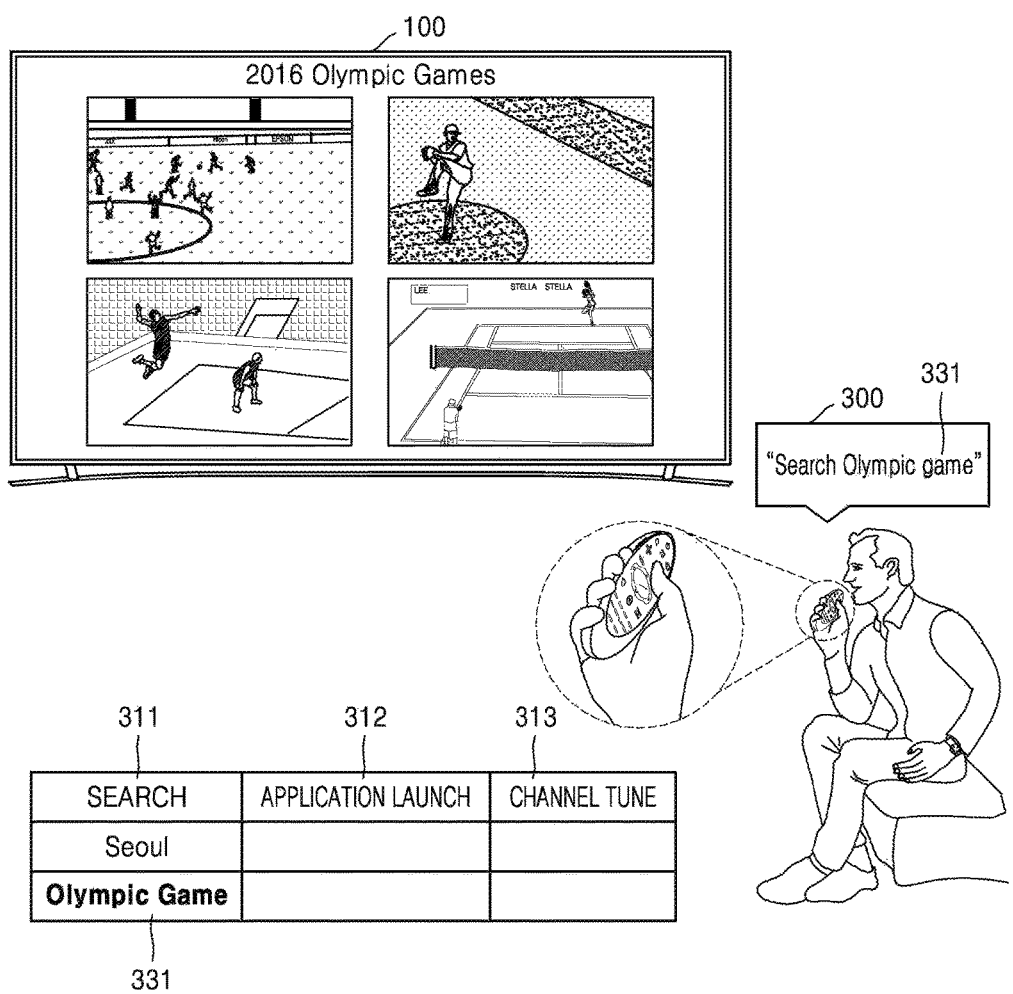
FIGS. 3A, 3B and 3C are views for describing a process of storing keywords according to categories, according to an exemplary embodiment.

FIG. 3A illustrates an example of the image display apparatus 100 storing a keyword related to a "search" category.

For example, as illustrated in FIG. 3A, when the image display apparatus 100 recognizes the sentence "search for Olympic games" 300 spoken by a user, the image display apparatus 100 may perform an operation of searching for the "Olympic games." However, sentences spoken by the user to search for the "Olympic games" are not limited to the example above, and may include "Olympic games," "find Olympic games," "search the web for Olympic games," etc.

When an operation corresponding to the sentence spoken by the user is successfully performed, the image display apparatus 100 may extract a keyword from the sentence spoken by the user. For example, when the operation of searching for the "Olympic games" is successfully performed when the user speaks the sentence "search for Olympic games" 300, the image display apparatus 100 may extract the keyword from the sentence "search for Olympic games" 300.

Here, "search for" or "find" is a word for the image display apparatus 100 to recognize the sentence spoken by the user as a command related to searching, and "Olympic games" 331 are words that the user wants to search for. The image display apparatus 100 may extract the "Olympic games" 331 as the keyword.

Also, the image display apparatus 100 may set a help category according to the operation performed in response to the sentence spoken by the user.

Figure 3B:
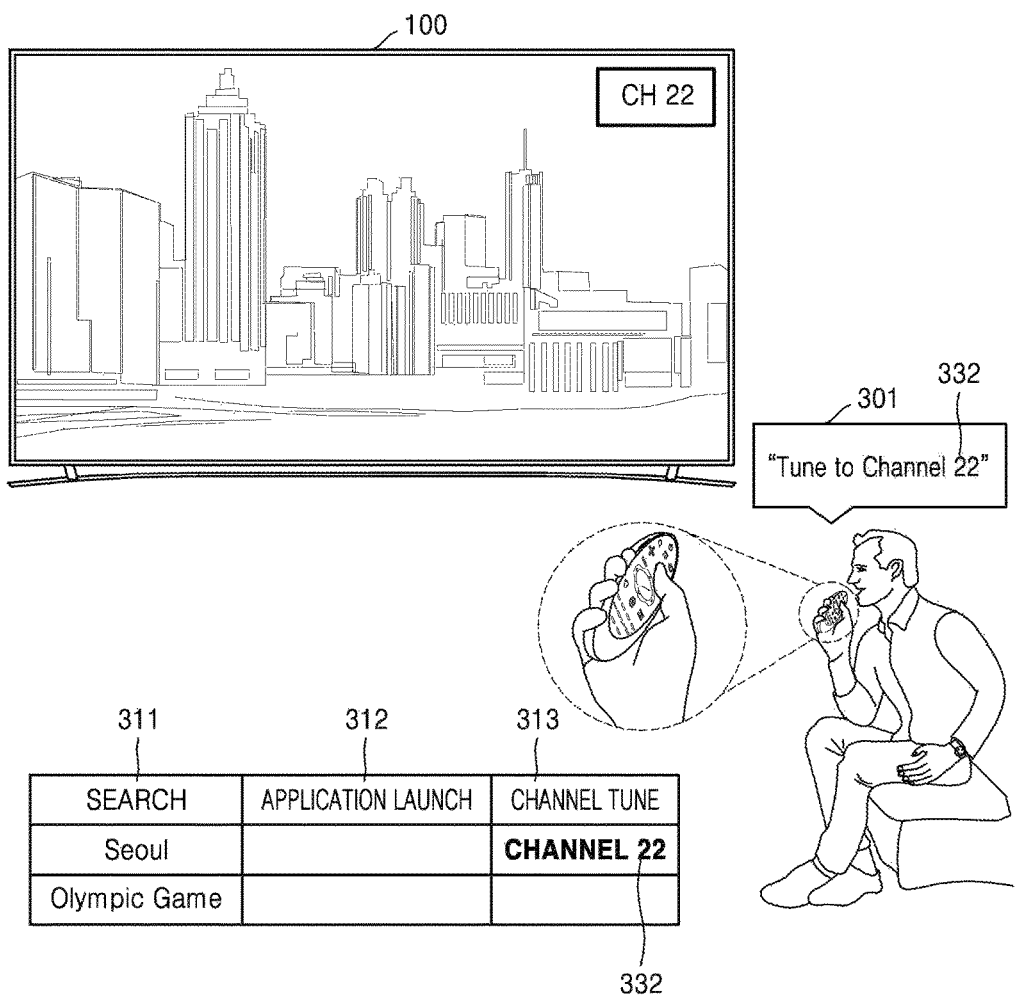
Figure 3C:
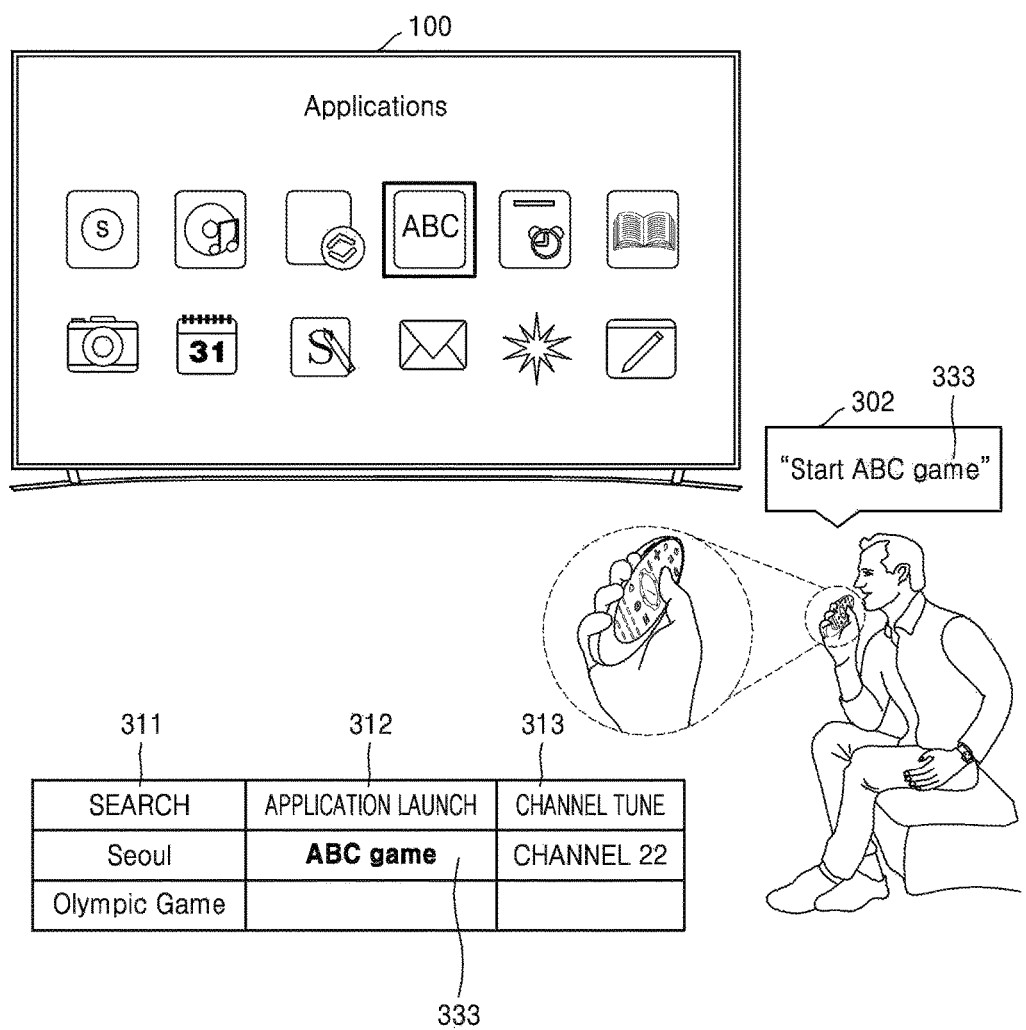

For example, referring to FIGS. 3A through 3C, the operation performed by the image display apparatus 100 in response to the sentence spoken by the user may include at least one of searching, executing an application, and changing a channel. Accordingly, the image display apparatus 100 may set at least one of search 311, application launch 312, and channel tune 313 as the help category. However, types of operations performed in response to the sentence spoken by the user and types of help categories are not limited to the examples described above. Hereinafter, for convenience of explanation, descriptions will be made by focusing on the case in which the help category includes the search 311, the application launch 312, and the channel tune 313.

The image display apparatus 100 may assign the extracted keyword to the help category and store the keyword.

For example, as illustrated in FIG. 3A, the image display apparatus 100 may assign the extracted keyword "Olympic games" 331 to the search category 311 and store the keyword. Keywords assigned to the search category 311 and stored may include TV programs, movie titles, movie actors/actresses, director names, etc., but are not limited thereto.

Referring to FIG. 3A, the image display apparatus 100 stores two keywords, "Seoul," and "Olympic games" in the search category 311. Here, that "Seoul" is stored before "Olympic games" denotes that "Seoul" is spoken by the user before "Olympic games" and "Seoul" is searched for before "Olympic games."

As another example, referring to FIG. 3B, in order to tune to channel 22, the user may speak a sentence 301, such as "tune to channel 22," "change the channel to channel 22," or the like. However, it is not limited thereto. When the sentence 301 spoken by the user, "tune to channel 22," is recognized by the image display apparatus 100, the image display apparatus 100 may change the channel to channel 22. Here, "tune to" or "change the channel to" are words for the image display apparatus 100 to recognize the sentence spoken by the user as a command related to channel shifting, and "channel 22" 332 is a channel that the user wants to tune to. Then, the image display apparatus 100 may extract "channel 22" 332 as the keyword.

Also, the image display apparatus 100 may assign the extracted "channel 22" 332 to the channel tune category 313 and store the keyword. Here, keywords assigned to the channel tune category 313 and stored may include channel names or channel numbers, but are not limited thereto.

Referring to FIG. 3C, in order to execute an application "ABC game," the user may speak a sentence 302, such as "run ABC game," or "start ABC game." For example, when the image display apparatus 100 recognizes the sentence "start ABC game" spoken by the user, the image display apparatus 100 may execute the "ABC game" application.

Here, "run" or "start" may be a word for the image display apparatus 100 to recognize the sentence spoken by the user as a command related to executing an application, and "ABC game" 333 is an application name that the user wants to execute. Then, the image display apparatus 100 may extract "ABC game" 333 as the keyword.

Also, the image display apparatus 100 may assign the extracted "ABC game" 333 to the application launch category 312 and store the keyword. Here, keywords assigned to the application launch category 312 and stored may be titles of applications installed in the image display apparatus 100, but are not limited thereto.

As described with reference to FIGS. 3A through 3C, the image display apparatus 100 may extract the keyword from the sentence spoken by the user, assign the extracted keyword to the help category, and store the keywords familiar to the user.

Also, the image display apparatus 100 may extract the keyword from the sentence spoken by the user, a spoken function of which is successfully performed. For example, when the user spoke "search for New York," but the spoken sentence was not recognized by the image display apparatus 100 and the image display apparatus 100 did not search for "New York," the image display apparatus 100 may not extract "New York" as the keyword. In other words, the image display apparatus 100 may extract the keyword from the sentence spoken by the user, the spoken function of which is successfully performed, and may store keywords that are familiar to the user.

Figure 4A:
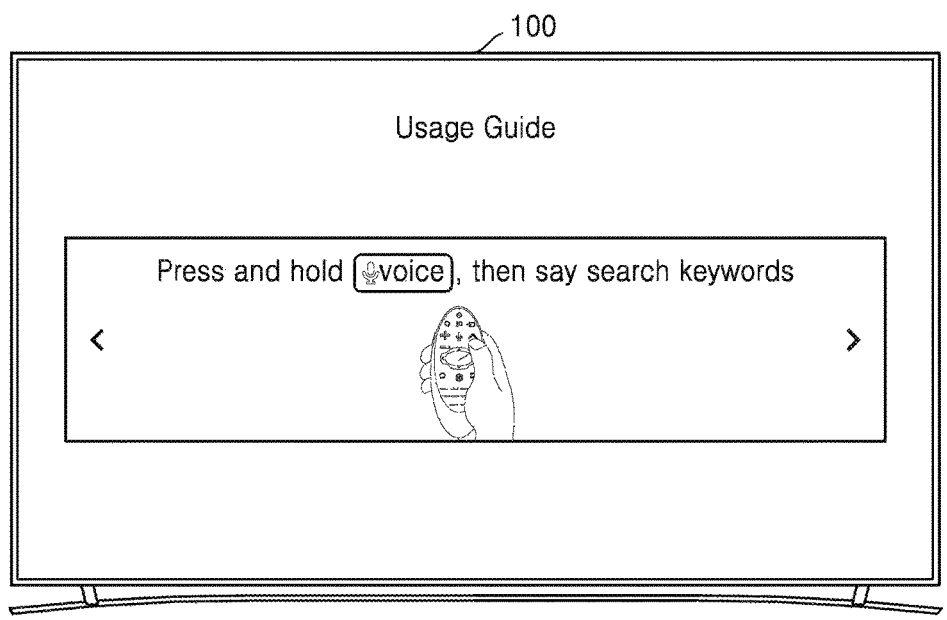
FIGS. 4A and 4B are views showing an example of an image display apparatus displaying an animation type use guide, according to an exemplary embodiment.
Figure 4A:
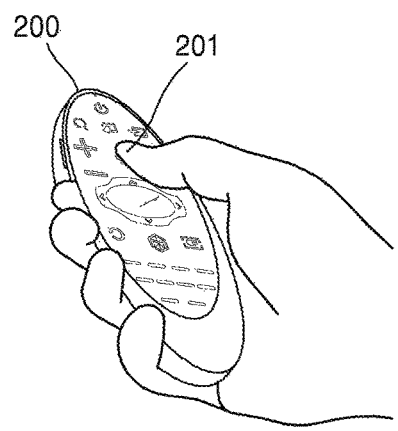
Figure 4B:
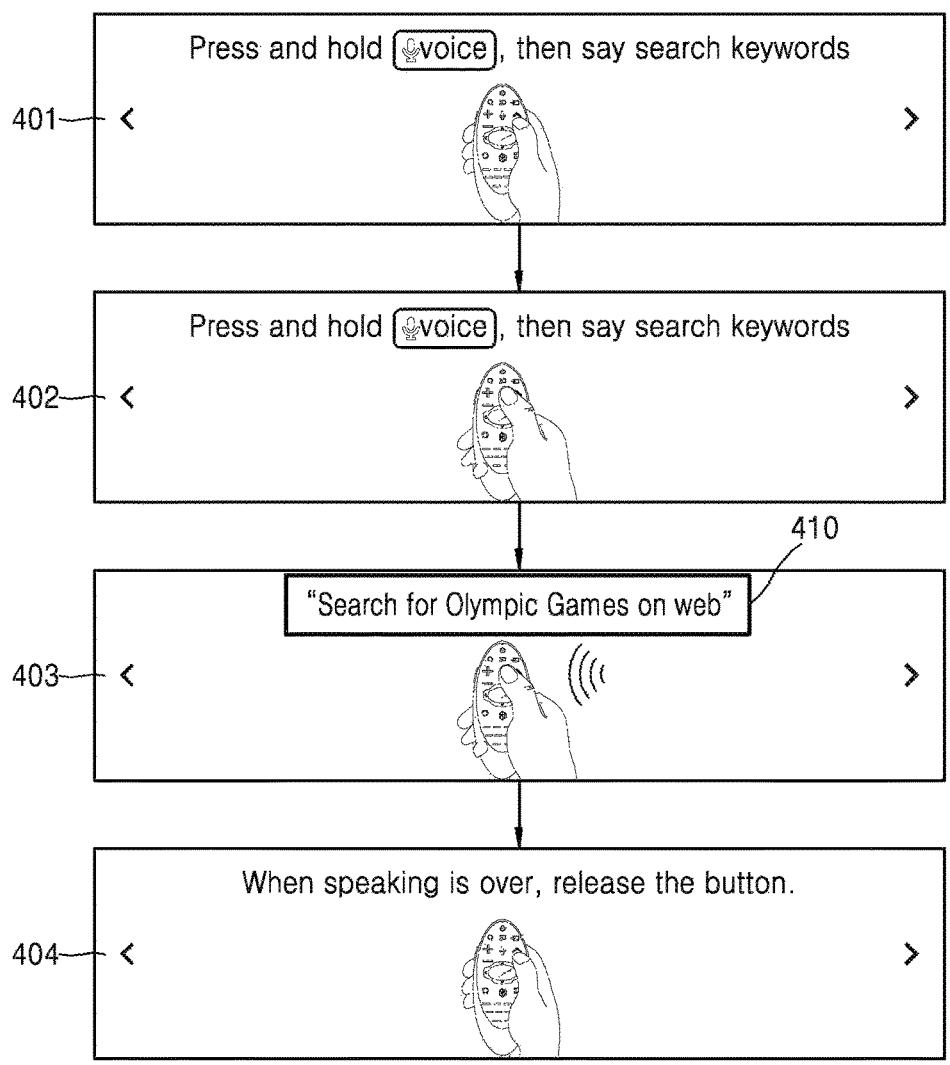

FIGS. 4A through 4B are views illustrating an example of the image display apparatus 100 providing an animation type use guide, according to an exemplary embodiment.

The image display apparatus 100 may display the animation type use guide on a screen in response to a user input requesting a use guide. Here, the user input requesting the use guide may be an input of selecting a certain button of the controller 200. For example, referring to FIG. 4A, the image display apparatus 100 may display the use guide in response to a user input of clicking a voice button 201 of the controller 200 one time. However, it is not limited thereto.

The image display apparatus 100 may sequentially show a plurality of images 401 through 404, to provide the animation type use guide, as illustrated in FIG. 4B. Also, when the image display apparatus 100 displays the help information (403), the image display apparatus 100 may display the help information generated based on the stored keyword and the help category.

For example, the image display apparatus 100 may generate the help information, such as "search for Olympic games," "find Olympic games," "search the web for Olympic games," etc., based on the search category 311 and the keyword "Olympic games" stored in the search category 311. Also, when the image display apparatus 100 provides the animation type use guide, the image display apparatus 100 may display the generated help information (410). The help information is not limited to the examples described above. The image display apparatus 100 may generate and display various help messages based on keywords and help categories.

Accordingly, the image display apparatus 100 may help the user more easily understand the use guide for using the voice recognition function.

Figure 5A:
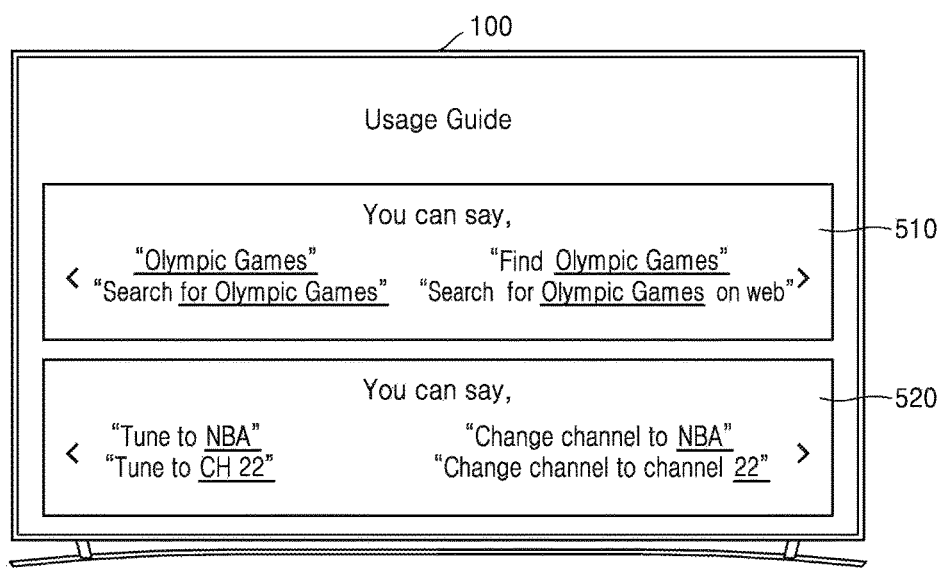
FIGS. 5A and 5B are views showing an example of an image display apparatus displaying a use guide, according to an exemplary embodiment.
Figure 5A:
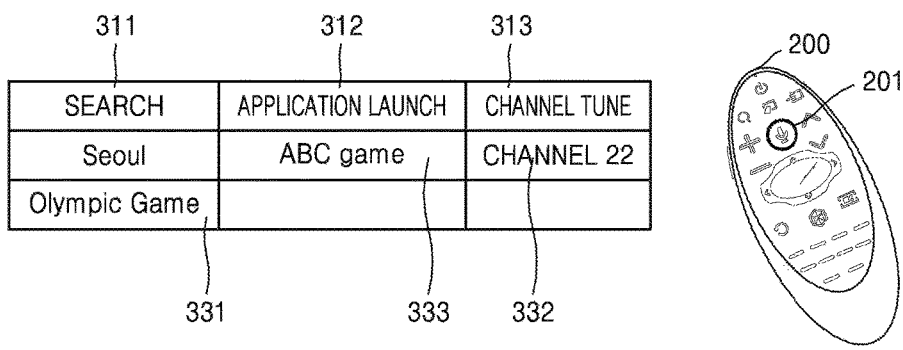
Figure 5B:
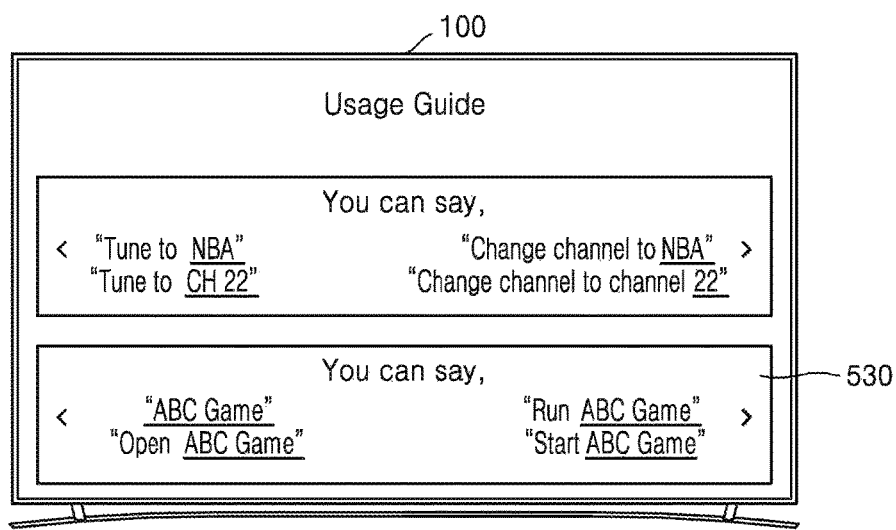
Figure 5B:
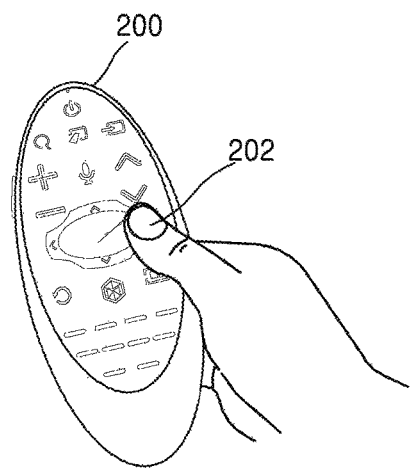

FIGS. 5A and 5B are views showing an example of the image display apparatus 100 displaying the use guide, according to an exemplary embodiment.

Referring to FIG. 5A, the image display apparatus 100 may display various sentences which may be spoken by a user for a certain operation to be performed, as help messages 510 and 520. Here, the image display apparatus 100 may display the plurality of help messages 510 and 520 for each help category. For example, as illustrated in FIG. 5A, the image display apparatus 100 may generate the help message 510 corresponding to the search category 311 by using the stored keyword "Olympic games" 331. For example, the image display apparatus 100 may display the help message 510 including, but not limited to, "Olympic games," "find Olympic games," "search for Olympic games," "search the web for Olympic games." Also, the image display apparatus 100 may display a list of the plurality of generated help messages 510.

Also, the image display apparatus 100 may generate help the message 520 corresponding to the channel tune category 313 by using the keyword "channel 22" 332 stored in the channel tune category 313. Here, the image display apparatus 100 may display various sentences which may be spoken by the user to change the channel as the help message. For example, the image display apparatus 100 may display the help messages including, but not limited to, "tune to channel 22," "change the channel to channel 22."

In addition, the image display apparatus 100 may display all of the generated help messages, according to a user input. For example, as illustrated in FIG. 5B, the image display apparatus 100 may further display another help message 530 in response to a user input selecting a direction key 202 corresponding to a left side or a right side. However, the present inventive concept is not limited thereto.

As described above, since "channel 22" and "Olympic games" are keywords that the user previously spoke, they may be familiar keywords to the user. As such, the image display apparatus 100 may help the user easily figure out what the user can speak when using the voice recognition function.

Figure 6:
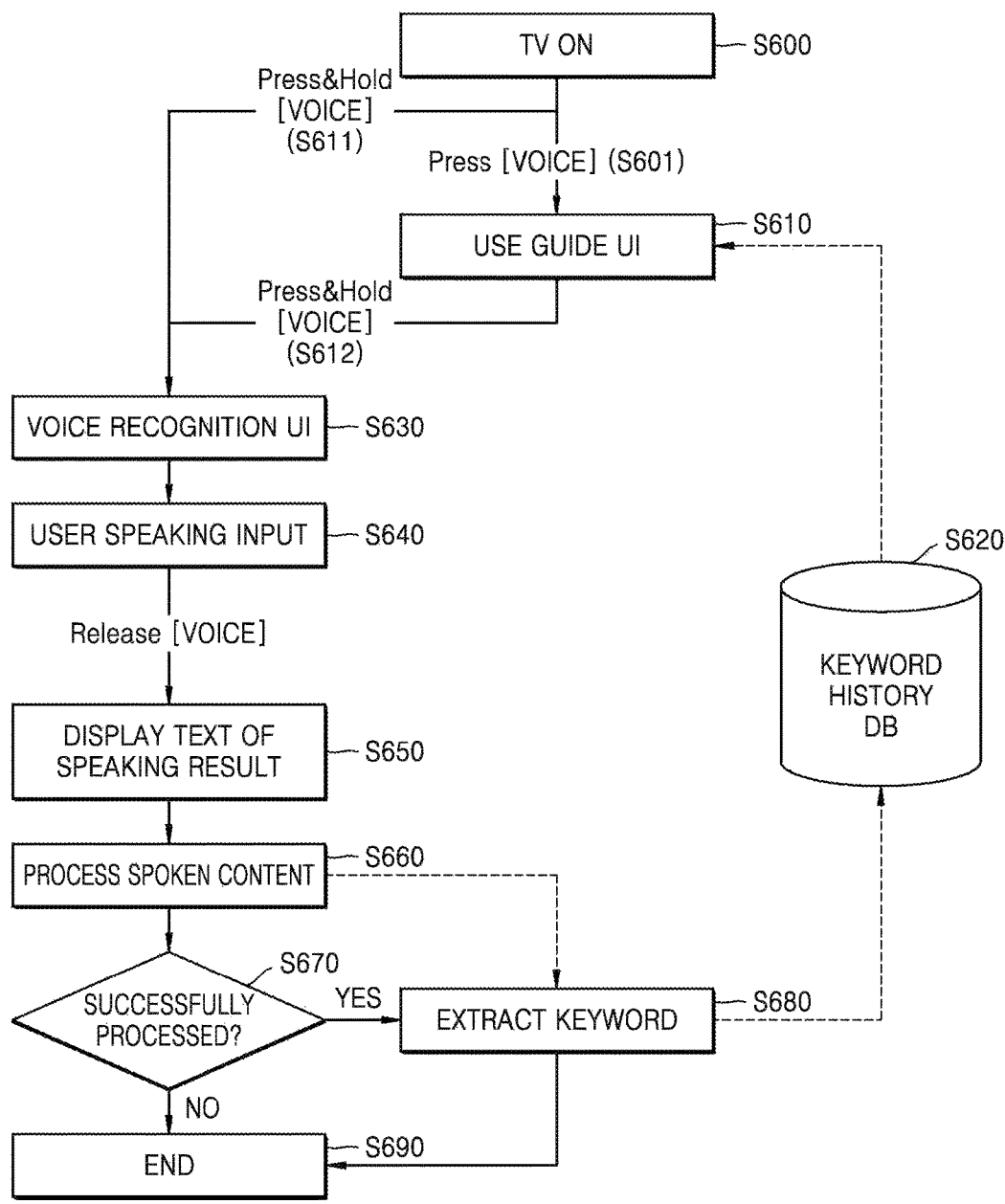
FIG. 6 is a flowchart of a method of displaying an image, according to an exemplary embodiment.

FIG. 6 is a flowchart of a method of displaying an image according to an exemplary embodiment.

After the image display apparatus 100 is turned on S600, the image display apparatus 100 may display a use guide user interface (UI) (S610), in response to a user input requesting for a use guide (S601). Here, the user input requesting for the use guide (S601) may be an input of selecting a certain key of the controller 200. For example, as illustrated in FIG. 6, the user input requesting for the use guide (S601) may be an input of selecting a "voice" key of the controller 200, but is not limited thereto.

The image display apparatus 100 may generate the help information based on the keyword that the user once spoke and display the generated help information when displaying the use guide. The image display apparatus 100 may store a predetermined number of recently spoken keywords from among keywords spoken by the user, in operation S620.

The user may use the voice recognition function after checking the use guide, or may use the voice recognition function right away without checking the use guide.

The image display apparatus 100 may provide a voice recognition UI (S630), in response to user inputs for using the voice recognition function (S611 and S612). Here, the image display apparatus 100 may provide the voice recognition UI (S630) in response to the user inputs selecting a certain key of the controller 200 (S611 and S612). For example, the user input may be an input selecting the "voice" key, as illustrated in FIG. 6. Also, according to an exemplary embodiment, the image display apparatus 100 may provide the use guide UI in response to an input of clicking the "voice" key one time, and provide the voice recognition UI in response to an input of clicking the "voice" key for a long time. However, it is not limited thereto.

In order for the image display apparatus 100 to perform a certain operation, the user may speak a certain sentence (S640). Here, for the image display apparatus 100 to recognize the sentence spoken by the user as sound data, signals indicating a start and an end of speaking may be transmitted to the image display apparatus 100. For example, the user may speak a certain sentence while the "voice" key is pressed, and may stop pressing the "voice" key when the user finishes speaking. However, it is not limited thereto.

Also, the image display apparatus 100 may display the sentence spoken by the user as a text (S650) and process the content spoken by the user (S660).

Also, the image display apparatus 100 may determine whether content of the sentence spoken by the user is successfully processed (S670). When it is determined that the content of the sentence spoken by the user is successfully processed, the image display apparatus 100 may extract the keyword from the sentence spoken by the user (S680), and assign the extracted keyword to the help category and store the keyword (S620). However, when it is determined that the content of the sentence spoken by the user was not successfully processed, the image display apparatus 100 may not extract the keyword from the sentence spoken by the user (S690).

Figure 7:
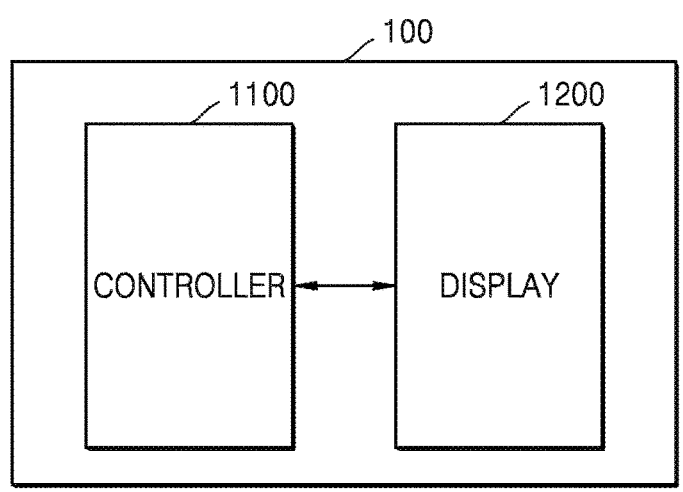
FIG. 7 is a block diagram of a structure of an image display apparatus according to an exemplary embodiment.

FIG. 7 is a block diagram of a structure of the image display apparatus 100 according to an exemplary embodiment.

Referring to FIG. 7, the image display apparatus 100 may include a controller 1100 and a display 1200. However, not all illustrated components are essential components. The image display apparatus 100 may include more or less components than those illustrated in FIG. 7.

Hereinafter, the components will be sequentially described.

The controller 1100 may extract a keyword from a sentence spoken by a user and assign the keyword to a help category. Here, the help category may be set based on a type of operation performed in response to the sentence spoken by the user. For example, the performed operation may include at least one of searching, executing an application, and changing a channel. Also, an image keyword may be a keyword that is extracted from the sentence, of which an operation corresponding to the content spoken by the user is successfully performed.

Also, the controller 1100 may determine a help category corresponding to the sentence spoken by the user by analyzing the sentence spoken by the user and the keyword extracted from the sentence into the determined help category.

The controller 1100 may generate help information based on the keyword and the help category. Here, the controller 1100 may generate the help information based on a keyword randomly selected from among stored keywords.

The display 1200 may display a use guide including the help information. Here, the display 1200 may display the use guide as an animation type or display the use guide by displaying a list of plurality of generated help messages.

Also, the display 1200 may display all of the generated help messages, according to a user input.

When the display 1200 and a touch pad are included in a layered structure to form a touch screen, the display 1200 may be used not only as an output device but also as an input device. The display 1200 may include at least one selected from a liquid crystal display, a thin film transistor-liquid crystal display, an organic light-emitting diode, a flexible display, a 3D display, and an electrophoretic display. Also, the image display apparatus 100 may include two or more displays 1200, according to types of the image display apparatus 100. Here, two or more displays 1200 may be arranged to face each other by using a hinge.

Figure 8:
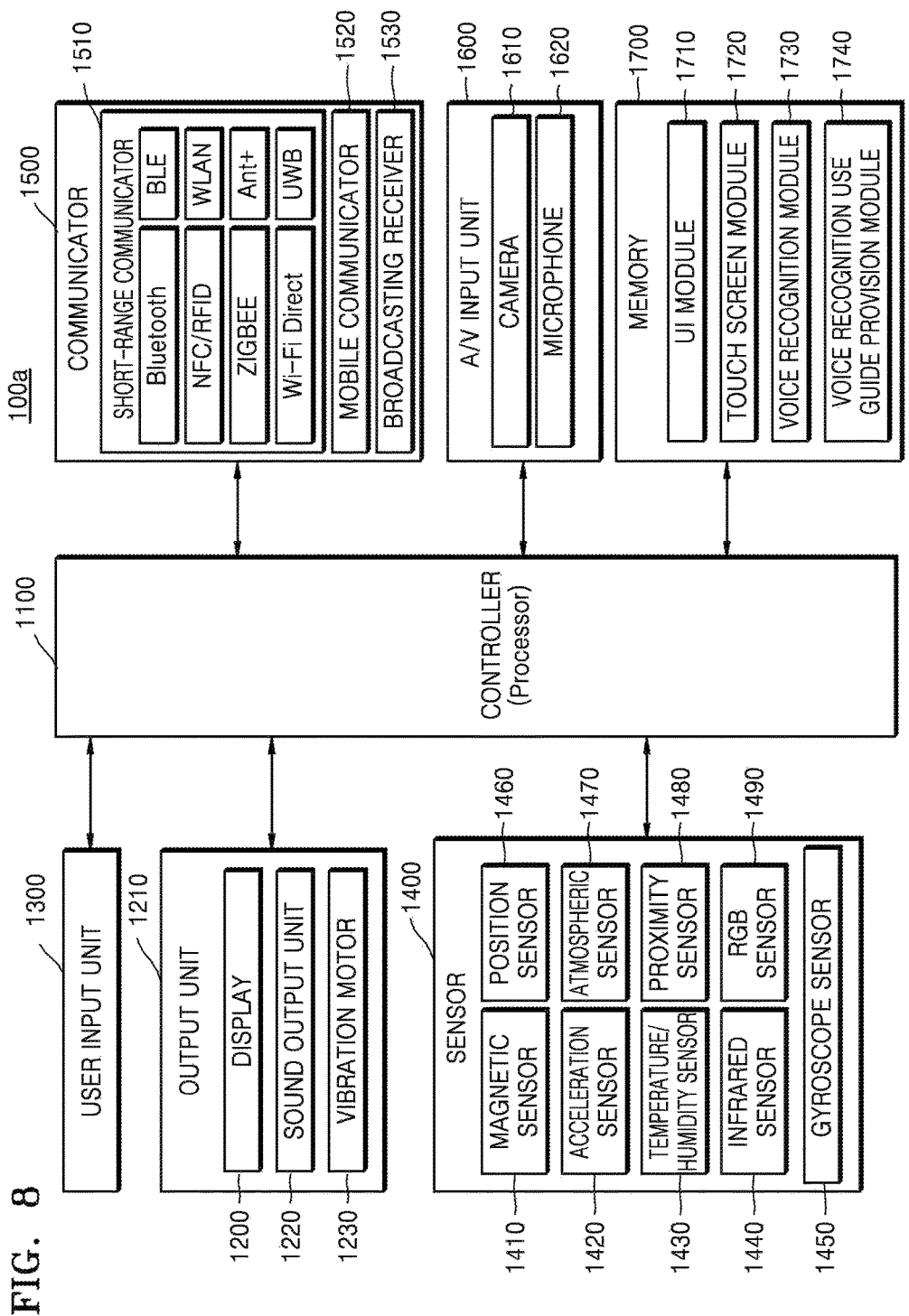
FIG. 8 is a block diagram of a structure of an image display apparatus according to another exemplary embodiment.

FIG. 8 is a block diagram of a structure of an image display apparatus 100a according to another exemplary embodiment.

As illustrated in FIG. 8, the image display apparatus 100a may further include a user input unit 1300, a sensor 1400, a communicator 1500, an audio/video (A/V) input unit 1600, and a memory 1700, in addition to the controller 1100 and the display 1200.

With respect to the controller 1100 and the display 1200, aspects that are the same as the aspects described with reference to FIG. 7 will not be repeatedly described.

The controller 1100 may provide a voice recognition use guide based on the help information generated from the keyword of the sentence spoken by the user, by executing at least one instruction included in a voice recognition module 1730 and a voice recognition use guide provision module 1740 stored in the memory 1700.

The user input unit 1300 is a device used by a user to input data to control the image display apparatus 100a. For example, the user input unit 1300 may be a key pad, a dome switch, a touch pad (using a touch-type capacitance method, a pressure-type resistive method, an infrared sensing method, a surface ultrasonic conductive method, an integral tension measuring method, a piezo effect method, etc.), a jog wheel, or a jog switch. However, the user input unit 1300 is not limited thereto.

The user input unit 1300 may receive an input for requesting the image display apparatus 100 to provide a use guide. Here, the user input for requesting for the use guide may be an input of selecting a certain key of the user input unit 1300. For example, when the user input unit 1300 includes the key pad or the dome switch, the user input for requesting for the use guide may be an input of clicking or pressing a certain key. Alternatively, when the user input unit 1300 includes the touch pad, the user input may be an input of touching a certain key. However, it is not limited thereto.

Also, the user input unit 1300 may be included in the controller 200 described above or in the image display apparatus 100*a*.

The output unit 1210 may include a sound output unit 1220 and a vibration motor 1230, in addition to the display 1200.

The sound output unit 1220 may output audio data received from the communicator 1500 or stored in the memory 1700. Also, the sound output unit 1220 outputs sound signals (for example, a call signal reception sound, a message reception sound, and an alarm sound) related to functions performed in the image display apparatus 100*a*. Also, the sound output unit 1220 may output audio data related to a use guide, when the use guide is displayed as a type of animation. For example, the sound output unit 1220 may output generated help information as a sound signal. The sound output unit 1220 may include a speaker, a buzzer, or the like.

The vibration motor 1230 may output a vibration signal. For example, the vibration motor 1230 may output the vibration signal corresponding to an output of audio data or video data (for example, the call signal reception signal, the message reception signal, etc.). Also, the vibration motor 1230 may output the vibration signal when a touch is input in a touch screen.

The sensor 1400 may sense a state of the image display apparatus 100*a* or a state of a surrounding environment of the image display apparatus 100*a* and transmit the sensed information to the controller 1100.

The sensor 1400 may include at least one selected from a magnetic sensor 1410, an acceleration sensor 1420, a temperature/humidity sensor 1430, an infrared sensor 1440, a gyroscope sensor 1450, a position sensor (for example, a GPS) 1460, an atmospheric sensor 1470, a proximity sensor 1480, and an illuminance sensor (RGB sensor) 1490. However, the sensor 1400 is not limited thereto. The function of each sensor may be instantly inferred by one of ordinary skill in the art in view of its name, and thus detailed descriptions will be omitted.

The communicator 1500 may include one or more components for communication between the image display apparatus 100*a* and an external device. For example, the communicator 1500 may include a short-range wireless communicator 1510, a mobile communicator 1520, and a broadcasting receiver 1530.

The short-range wireless communicator 1510 may include a Bluetooth communicator, a Bluetooth low energy (BLE) communicator, a near-field communicator, a WLAN (Wi-Fi) communicator, a Zigbee communicator, an infrared data association (IrDA) communicator, a Wi-Fi direct (WFD) communicator, an ultra wideband (UWB) communicator, and an Ant+ communicator. However, the short-range wireless communicator 151 is not limited thereto.

The mobile communicator 1520 exchanges wireless signals with at least one selected from a base station in a mobile communication network, an external terminal, and a server. Here, the wireless signals may include sound call signals, internet protocol video call signals, or various types of data according to exchanging of text/multimedia messages.

The broadcasting receiver 1530 receives broadcasting signals from the outside via broadcasting channels and/or information related to broadcasting. The broadcasting channels may include satellite channels and ground wave channels. According to exemplary embodiments, the image display apparatus 100*a* may not include the broadcasting receiver 1530.

The A/V input unit 1600 is configured to input audio signals or video signals, and may include a camera 1610 and a microphone 1620.

The camera 1610 may obtain an image frame, such as a still image or a video, via an image sensor, in an internet protocol video mode or a photographing mode. The image captured via the image sensor may be processed via the controller 1100 or an additional image processing unit (not shown).

The image frame processed in the camera 1610 may be stored in the memory 1700 or transmitted to the outside via the communicator 1500. Two or more cameras 1610 may be included according to the types of the image display apparatus 100*a*.

The microphone 1620 receives an input of an external sound signal and processes the external sound signal as electrical sound data. For example, the microphone 1620 may receive sound signals from an external device or a speaker. Also, the microphone 1620 may receive a sound signal spoken by a user and process the sound signal as electrical sound data. Thus, the image display apparatus 100*a* may recognize a meaning of the sound signal spoken by the user, based on the electrical sound data processed by the microphone 1620. The microphone 1620 may use various noise elimination algorithms for removing noises generated in the process in which external sound signals are input.

The memory 1700 may store programs for processing and controlling the controller 1100, and may store data that is input in the image display apparatus 100*a* or output from the image display apparatus 100*a*.

The memory 1700 may include at least one type of storage medium selected from a flash memory type, a hard disk type, a multimedia card micro type, a card type memory (for example, SD or XD memory, etc.), random access memory (RAM), static random access memory (SRAM), read-only memory (ROM), electrically erasable programmable read-only memory (EEPROM), programmable read-only memory (PROM), a magnetic memory, a magnetic disk, and an optical disk.

Programs stored in the memory 1700 may be divided into a plurality of modules according to their functions. For example, the programs may be divided into a user interface (UI) module 1710, a touch screen module 1720, and the voice recognition module 1730, the voice recognition use guide provision module 1740, etc., but are not limited thereto.

The UI module 1710 may provide a specialized UI connected with the image display apparatus 100*a*, for example, a graphic user interface (GUI), according to applications. The touch screen module 1720 may sense a touch gesture of a user on a touch screen, and may transmit information about the touch gesture to the controller 1100. The touch screen module 1720 may recognize and analyze a touch code. The touch screen module 1720 may be formed as separate hardware including a controller.

Various sensors may be included in the touch screen or around the touch screen to sense a touch or a proximity touch of the touch screen. An example of the sensor for sensing the touch of the touch screen is an antenna sensor. The antenna sensor refers to a sensor that senses a contact of a specific object, by a degree in which human beings sense or by a higher degree than the degree in which human beings sense. The antenna sensor may sense various information including a roughness of a contact surface, a rigidity of a contact object, and a temperature of a contact point.

Also, another example of the sensor for sensing the touch of the touch screen is a proximity sensor.

The proximity sensor refers to a sensor that senses an object that approaches a predetermined sensing surface or senses whether there is an object existing near the sensing surface by using an electromagnetic force or infrared rays, without a mechanical contact. Examples of the proximity sensor may include a transmittance photoelectricity sensor, a direct reflective photoelectricity sensor, a mirror-reflective photoelectricity sensor, a radio frequency oscillation proximity sensor, a capacitance proximity sensor, a magnetic proximity sensor, an infrared proximity sensor, etc. The touch gesture of the user may include tapping, touch and hold, double tapping, dragging, panning, flicking, drag and drop, and swiping.

The voice recognition module 1730 may process an operation which is necessary for the image display apparatus 100*a* to provide a voice recognition function. For example, the voice recognition module 1730 may extract and analyze a characteristic of a received sound signal and identify a meaning of the sound signal.

The voice recognition use guide provision module 1740 may include at least one instruction for extracting a keyword from a sentence spoken by the user, dividing the extracted keyword into a help category, and generating help information based on the help category and the keyword.

Also, the voice recognition use guide provision module 1740 may include at least one instruction for determining a help category corresponding to the sentence spoken by the user by analyzing the sentence spoken by the user, and dividing the keyword extracted from the sentence into the determined help category.

FIGS. 7 and 8 show the block diagrams of the image display apparatuses 100 and 100*a* according to exemplary embodiments. Components of each block diagram may be combined, added, or omitted, according to specifications of the image display apparatuses 100 and 100*a* that are actually realized. That is, more than two components may be combined into one component, or one component may be divided into two components, according to necessity. Also, the functions performed in each block diagram are for describing the exemplary embodiments, and specific operations or devices of each block diagram do not limit the scope of the present disclosure.

The method of the present inventive concept may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the inventive concept or may be known to and usable by one of ordinary skill in a field of computer software. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical disks), and hardware devices that are specially configured to store and carry out program commands (e.g., ROMs, RAMs, or flash memories). Examples of the program commands include a high-level language code that may be executed by a computer using an interpreter as well as a machine language code made by a complier.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. Components that are integrally described may be executed in a distributed fashion. Likewise, components that are separately described may be executed in a combined fashion.

While one or more exemplary embodiments have been described with reference to the figures, it will be understood by those of ordinary skill in the art that various changes in form and details may be made therein without departing from the spirit and scope as defined by the following claims.

What is claimed is:

1. An image display apparatus comprising:
a display;
a storage configured to store a keyword spoken by a user; and
a controller configured to:
analyze a sentence spoken by the user;
extract a keyword from the analyzed sentence and determine a command category by which the extracted keyword is classified based on a command word comprised in the analyzed sentence;
store the extracted keyword according to the determined command category in the storage; and
in response to receiving a user input requesting a help sentence, generate one or more help sentence including the stored keyword and one of a plurality of command words included in the determined command category corresponding to the stored keyword; and
control the display to display the generated one or more help sentence.

2. The image display apparatus of claim 1, wherein the command category is set based on a type of an operation performed in response to the sentence spoken by the user.

3. The image display apparatus of claim 2, wherein the operation comprises at least one of searching, executing an application, and changing a channel.

4. The image display apparatus of claim 1, wherein the controller is further configured to extract the keyword from the sentence spoken by the user when content of the sentence spoken by the user is successfully processed.

5. The image display apparatus of claim 1, wherein the controller is further configured to store a predetermined number of recently spoken keywords.

6. The image display apparatus of claim 1, wherein the controller is further configured to generate the help sentence by combining a keyword randomly selected from among stored keywords and one of a plurality of commands included in a command category which is related to the selected keyword.

7. The image display apparatus of claim 1, wherein the controller is further configured to control the display such that the display displays all of the generated help sentence, according to a user input.

8. An operating method of an image display apparatus, the method comprising:

analyzing a sentence spoken by a user;

extracting a keyword from the analyzed sentence and determining a command category by which the extracted keyword is classified based on a command word comprised in the analyzed sentence;

storing the extracted keyword according to the determined command category in a storage; and in response to receiving a user input few requesting a help sentence, generating one or more help sentence including the stored keyword and one of a plurality of command words included in the determined command category corresponding to the stored keyword; and displaying the generated one or more help sentence.

9. The method of claim 8, wherein the command category is set based on a type of an operation performed in response to the sentence spoken by the user.

10. The method of claim 9, wherein the operation comprises at least one of searching, executing an application, and changing a channel.

11. The method of claim 8, wherein the extracting of the keyword comprises extracting the keyword from the sentence spoken by the user when content of the sentence spoken by the user is successfully processed.

12. The method of claim 8, further comprising storing the extracted keyword, wherein the storing of the extracted keyword comprises storing a predetermined number of recently spoken keywords.

13. The method of claim 8, wherein the generating of the one or more help sentence comprises:

generating the help sentence by combining a keyword randomly selected from among stored keywords and one of a plurality of commands included in a command category which is related to the selected keyword.

14. The method of claim 8, wherein the displaying of the help sentence comprises:

displaying all of the generated help sentence, according to a user input.

15. A non-transitory computer-readable recording medium having embodied thereon a computer program for executing the method of claim 8.

* * * * *